(12) United States Patent  (10) Patent No.: US 6,866,165 B2
Heathcock et al.  (45) Date of Patent: Mar. 15, 2005

(54) SPRAY CANISTER

(75) Inventors: John A. Heathcock, Racine, WI (US); Dale Aberegg, Mount Vernon, OH (US); Cathal L. Fahy, Columbus, OH (US); Tracey A. Frosch, Racine, WI (US); Steven A. Zach, Racine, WI (US); Brian K. Linstedt, Ostrander, OH (US)

(73) Assignee: S.C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 10/384,877

(22) Filed: Mar. 7, 2003

(65) Prior Publication Data

US 2004/0028458 A1 Feb. 12, 2004

Related U.S. Application Data

(63) Continuation-in-part of application No. 09/951,632, filed on Sep. 14, 2001, now Pat. No. 6,551,001.

(51) Int. Cl.⁷ .............................................. B67D 5/64
(52) U.S. Cl. ................ 222/174; 222/183; 222/402.13; 222/402.15
(58) Field of Search ............................. 222/174, 183, 222/402.13, 402.15, 402.25

(56) References Cited

U.S. PATENT DOCUMENTS

| | | | |
|---|---|---|---|
| 3,679,319 A | | 7/1972 | Munchel et al. |
| 3,794,217 A | | 2/1974 | Munchel |
| 3,856,209 A | * | 12/1974 | Hickson ............... 239/532 |
| 3,977,570 A | * | 8/1976 | Smrt ..................... 222/174 |
| 4,277,004 A | * | 7/1981 | Barlics ............... 222/402.14 |
| 4,426,026 A | | 1/1984 | Knickerbocker |
| 4,789,084 A | | 12/1988 | Yoshitomi |
| 4,886,191 A | | 12/1989 | Yoshitomi |
| 5,779,155 A | | 7/1998 | Schennum et al. |
| 5,875,926 A | * | 3/1999 | Schwartz ................ 222/79 |
| 5,918,565 A | * | 7/1999 | Casas .................. 116/211 |
| 6,161,735 A | * | 12/2000 | Uchiyama et al. ..... 222/402.13 |
| 6,375,049 B1 | * | 4/2002 | Geier ................. 222/402.1 |
| 6,450,423 B1 | * | 9/2002 | Gurule ................ 239/531 |
| 6,494,349 B1 | * | 12/2002 | Thompson et al. .... 222/402.15 |

FOREIGN PATENT DOCUMENTS

| | | |
|---|---|---|
| EP | 819619 A1 | 1/1998 |
| GB | 2011549 A | 7/1979 |
| GB | 2018907 | 10/1979 |
| JP | 7222944 | 8/1995 |

OTHER PUBLICATIONS

Page 43 of an undated Summit Packaging Systems ad entitled "F–83 Female Valve", admitted prior art.

An undated Summit Packaging Systems ad entitled "Actuators—F–83 Female Valve", admitted prior art.

* cited by examiner

*Primary Examiner*—Joseph A. Kaufman

(57) ABSTRACT

A trigger-actuated cleaning device dispenses an aerosol cleaning agent from a pressurized canister. The canister has a female valve assembly. In one form an over cap fits onto the canister over the valve and has a male stem on a pivotable part of the over cap that opens the valve when moved by a rod linked to a remote trigger. The stem is either formed integrally with the over cap or is removably attached to a stem socket formed in the over cap. In another form the actuator is a button having a stem that fits in the female valve.

11 Claims, 11 Drawing Sheets

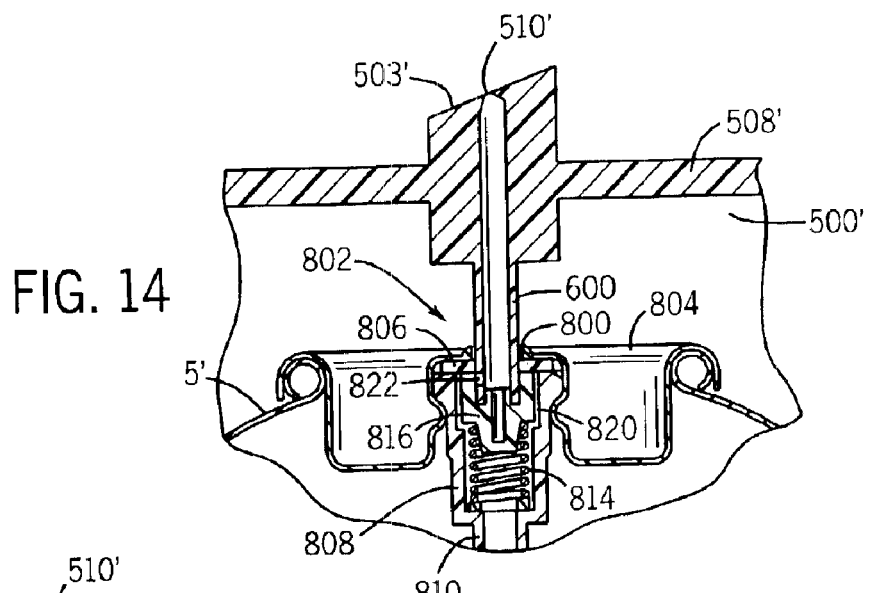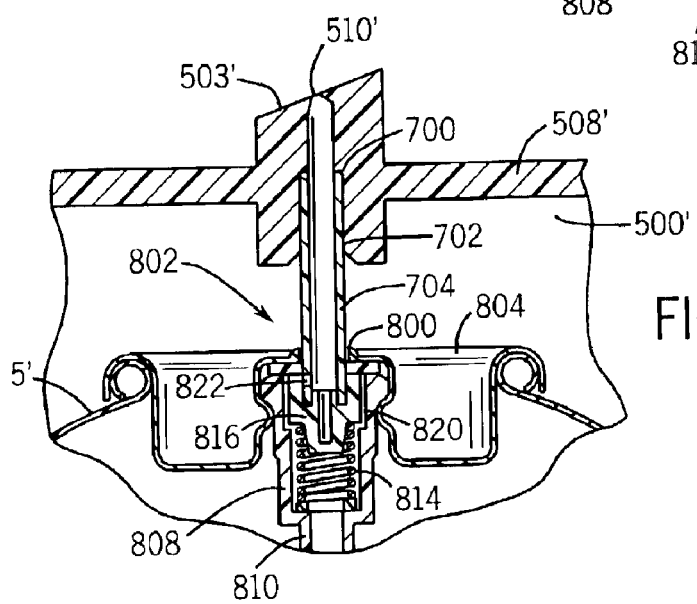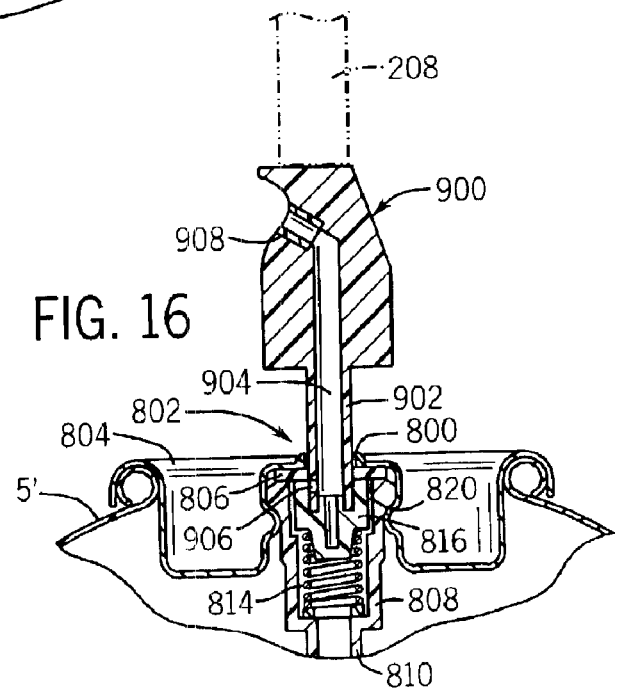

SPRAY CANISTER

CROSS-REFERENCE TO RELATED APPLICATIONS

This is a continuation-in-part of U.S. Ser. No. 09/951,632, filed on Sep. 14, 2001, now U.S. Pat. No. 6,551,001.

STATEMENT OF FEDERALLY SPONSORED RESEARCH/DEVELOPMENT

Not applicable.

FIELD OF THE INVENTION

The present invention relates to aerosol spray cans and the like. More particularly it relates to improved over cap/valving structures that render such cans particularly well suited for remote trigger activation.

BACKGROUND OF THE INVENTION

The cleaning of houses, office buildings, and certain other structures can be challenging due to high ceilings, furniture placed within rooms, and other structural features. For example, the physical dimensions of various furniture can limit one's ability to clean under them, ceiling corners can be difficult to reach, and bending or crouching to clean floors can strain one's back.

Moreover, people engaging in cleaning operations on a regular basis may be concerned about frequent contact with various chemicals found in cleaning preparations. Regardless of whether this is just a matter of consumer perception, or whether the concerns relate to actual medical or safety issues (e.g. skin irritation), this can affect consumer preferences. Concerns about contacting such chemicals may be perceived as greater when the consumer needs to place their finger in close proximity to a dispenser outlet in order to dispense the chemical, or if the chemical is sprayed in close proximity to where the human's head is.

Hence, there have been a number of attempts to separate the trigger for an aerosol can from the outlet, sometimes by several feet. See e.g. U.S. Pat. Nos. 3,679,319, 3,794,217, 4,789,084, 4,886,191 and 5,779,155. The disclosure of these patents, and the priority application referred to above, are incorporated herein by reference as if fully set forth herein.

Another concern is that while an adult will typically prefer an over cap and valve for an aerosol can that is intuitive in its operation and relatively easy to use, this may not be optimal in all cases. For example, aerosol cans that are too easy to trigger may lead to accidental or unauthorized discharge. Balancing the need for easy operation with the desire for control over use can be challenging, particularly when a remote triggering system, or an aerosol over cap, activates the aerosol can.

A particular problem when using a remote triggering system is the reliance aerosol cans typically have-on protruding valve stems. Such stems can suffer from reliability issues such as breaking off during use. Also, they can lead to undesired dispensing since they are always linked to the dispensing valve after manufacture.

In separate, unrelated work, Summit Packaging Systems, Inc. has developed a female valve for an aerosol container. The valve is operated by a push button having an integral downwardly projecting valve stem. While this structure has addressed some of the issues described above, to our knowledge female aerosol valves have not reliably been adapted for use with remotely triggered sprayers used for cleaning, or adapted for use with over cap actuators.

Thus, a need exists to provide devices which better address these concerns, particularly in the context of remotely triggered sprayers and sprayers relying on over cap actuators, while still retaining the capability of performing core dispensing functions.

SUMMARY OF THE INVENTION

In one aspect the invention provides an aerosol canister assembly for delivering a chemical from an interior cavity of a canister to a desired location. The assembly includes a canister suitable for holding a chemical mixed with a pressurized propellant gas.

The particular chemical to be delivered is not critical. It may be any of the known chemicals that are delivered from aerosol containers (most preferably a surfactant based cleaning chemical such as one used for floor care in the S. C. Johnson Go Mop™ system or an insecticide commonly delivered by aerosol spray).

Similarly, the propellant gas is not critical. It may be any of the known propellant gasses commonly used with aerosol containers. Particularly preferred propellant gasses are hydrocarbon propellants such as propane, butane, isopropane, isobutane, and mixes thereof, but many other propellant gasses may be used.

In accordance with the invention, the canister has a valve with an open (typically upwardly open) female cavity. The valve is suitable for controlling the delivery of the chemical from the canister to the outside of the canister when the chemical is positioned in the canister with the propellant gas. An over cap is positionable on the canister over the valve, the actuator having a nozzle opening and being linked to a valve stem.

When the valve stem is inserted into the female cavity by axial (typically axially downward) relative movement there between, the valve stem defines a pathway for expelling the chemical. The chemical passes through the valve, through the valve stem, and from the nozzle opening. The nozzle opening may be a radial or axial opening.

The valve stem is either an integral part of the over cap or removably connected to the over cap. In the latter case the over cap has a stem socket in communication with the nozzle opening, the stem socket being sized to receive the valve stem. It opens to an interior defined by a cylindrical wall extending to one side of a top wall of the over cap.

In a most preferred form the over cap has a radially peripheral wall to which is hinged a lever arm suitable for mounting the valve stem for displacement of the valve. The lever arm includes the nozzle opening and defines a stem socket sized to receive the valve stem.

In another aspect the invention provides a cleaning device. It has a cleaning head, a housing connected to the cleaning head for retaining a spray canister, and a shaft connected to the housing at one end and mounting a handle at an opposite end, the handle having a trigger.

There is also an aerosol canister assembly for delivering a chemical from an interior cavity of a canister to a desired location adjacent the cleaning head. That assembly has a canister suitable for holding a chemical mixed with a pressurized propellant gas, the canister having a valve with an axially open female cavity. The valve is suitable for controlling the delivery of the chemical from the canister to the outside of the canister when the chemical is positioned in the canister with the propellant gas.

There is also in the canister assembly an actuator positionable on the canister adjacent the valve, the actuator having a nozzle opening and being linked to a valve stem. The valve stem is insertable into the female cavity by axial relative movement there between, the valve stem defining a pathway for expelling the chemical in the canister from the nozzle opening when the valve is opened by the valve stem.

The cleaning device also has an initiator assembly causing movement of the trigger to move a portion of the actuator when the chemical is to be dispensed. Hence, the cleaning chemical can be sprayed by a remote spraying apparatus.

In preferred forms of the cleaning device, the shaft is hollow and the initiator assembly includes a core slidable in the shaft and a rod disposed in the housing in contact with a pivot link pivotally attached to the housing and coupled to the slidable core. The trigger is actuated to slide the slidable core, which in turn pivots the pivot link and brings the rod into contact with the actuator. Also, the rod and the slidable core move in substantially opposite directions.

In another preferred form of the cleaning device, the housing includes an alignment protrusion and the actuator is in the form of an over cap having a top wall defining a recess sized to receive the alignment protrusion such that the over cap is received in the housing in a correct orientation. In this embodiment the valve stem defines a passageway in communication with a spray nozzle adapted to provide a fan-shaped spray.

In another aspect of the cleaning device, the actuator can be in the form of a button having a valve stem either integrally formed therewith or removably connected to the button.

It will be appreciated that the present invention improves aerosol canisters and their triggering systems, particularly those that are well suited for remote triggering or use with over caps. When the actuator is separate from the canister (e.g. during manufacturing, shipment or storage) the canister cannot be easily activated. Hence, the product is less likely to be accidentally discharged, or discharged by those not authorized to use the product at such times.

Further, should a valve stem break off, it can readily be removed from the canister, with the canister then being activated by a replacement actuator. This minimizes consumer dissatisfaction should a remote triggering apparatus cause a stem to break off in a conventional can.

The foregoing and other advantages of the present invention will appear from the following description. In the description reference is made to preferred embodiments of the invention. These embodiments do not represent the full scope of the invention. Rather, reference should therefore be made to the claims herein for interpreting the full scope of the invention.

BRIEF DESCRIPTION OF THE DRAWINGS

FIG. 14 is a partial sectional view of an alternate embodiment of the over cap having a unitary valve stem;

FIG. 15 is a view similar to FIG. 14, but of another embodiment of the over cap having a separable valve stem; and FIG. 16 is a view similar to FIG. 14, but of yet another embodiment of the invention in which a button actuator having a valve stem takes the place of an over cap.

DETAILED DESCRIPTION OF THE INVENTION

FIGS. 1–12 show a mop of the present invention which has an upper trigger that can be used to remotely activate a lower aerosol canister to thereby spray a cleaning chemical adjacent a mop head. Apart from the actuator/valve interface, the structure and operation of this system was described in somewhat greater detail in the priority application (U.S. Ser. No. 09/951,632, filed Sep. 14, 2001, now allowed).

Figure 1:
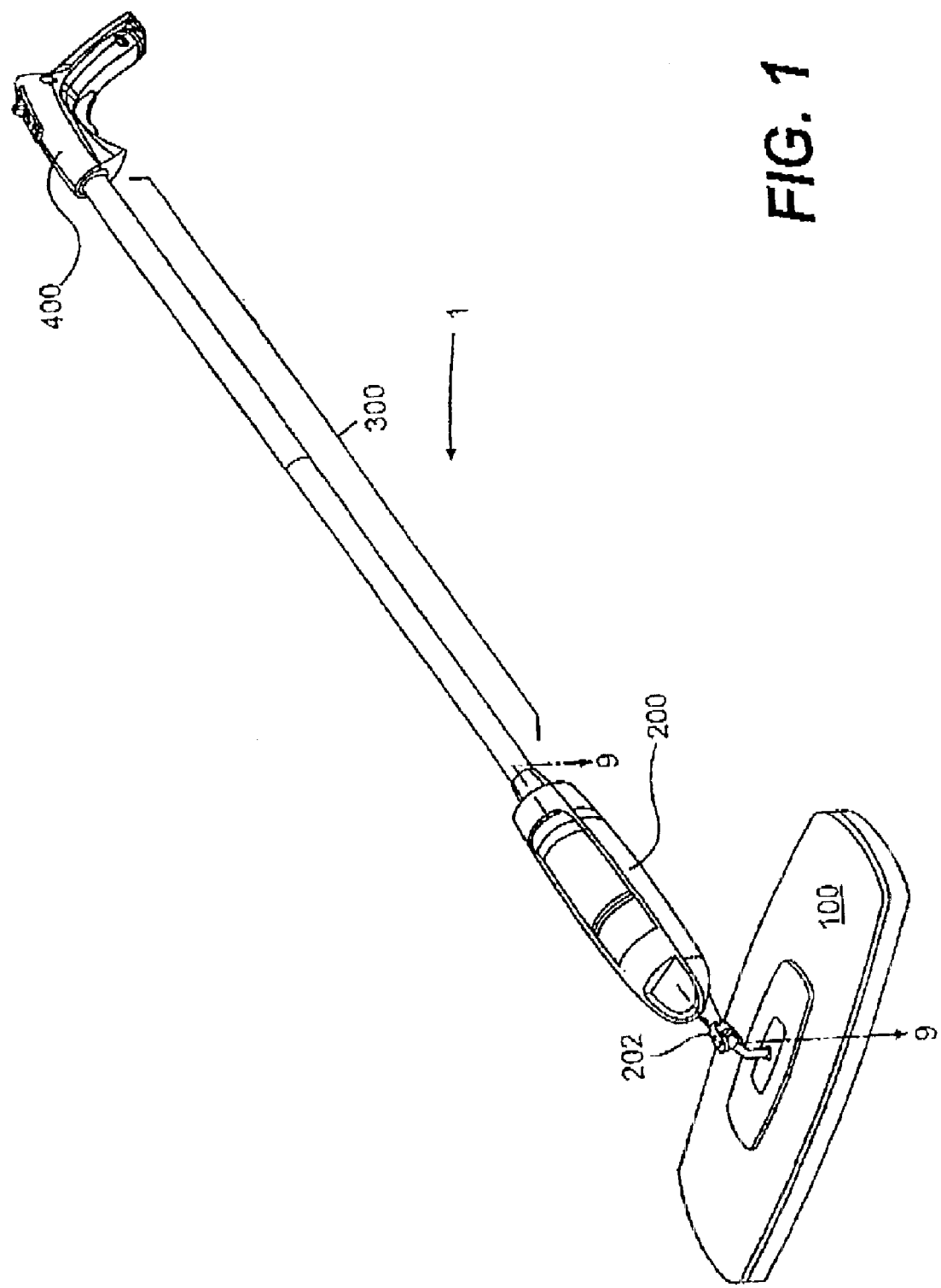
FIG. 1 shows a perspective view of a mop having a trigger-actuated spray canister according to this invention.

FIG. 1 shows the invention according to a preferred embodiment. A trigger-actuated mop 1 comprises a mop head 100, a housing 200, a shaft assembly 300, and a handle 400. The mop head 100 holds a cleaning device such as, by way of non-limiting example, a sponge or disposable/replaceable cloth. The housing 200 connects to the mop head 100 by way of a U-shaped hinge 202, which engages a protrusion and a ball joint on the mop head 100.

Figure 2:
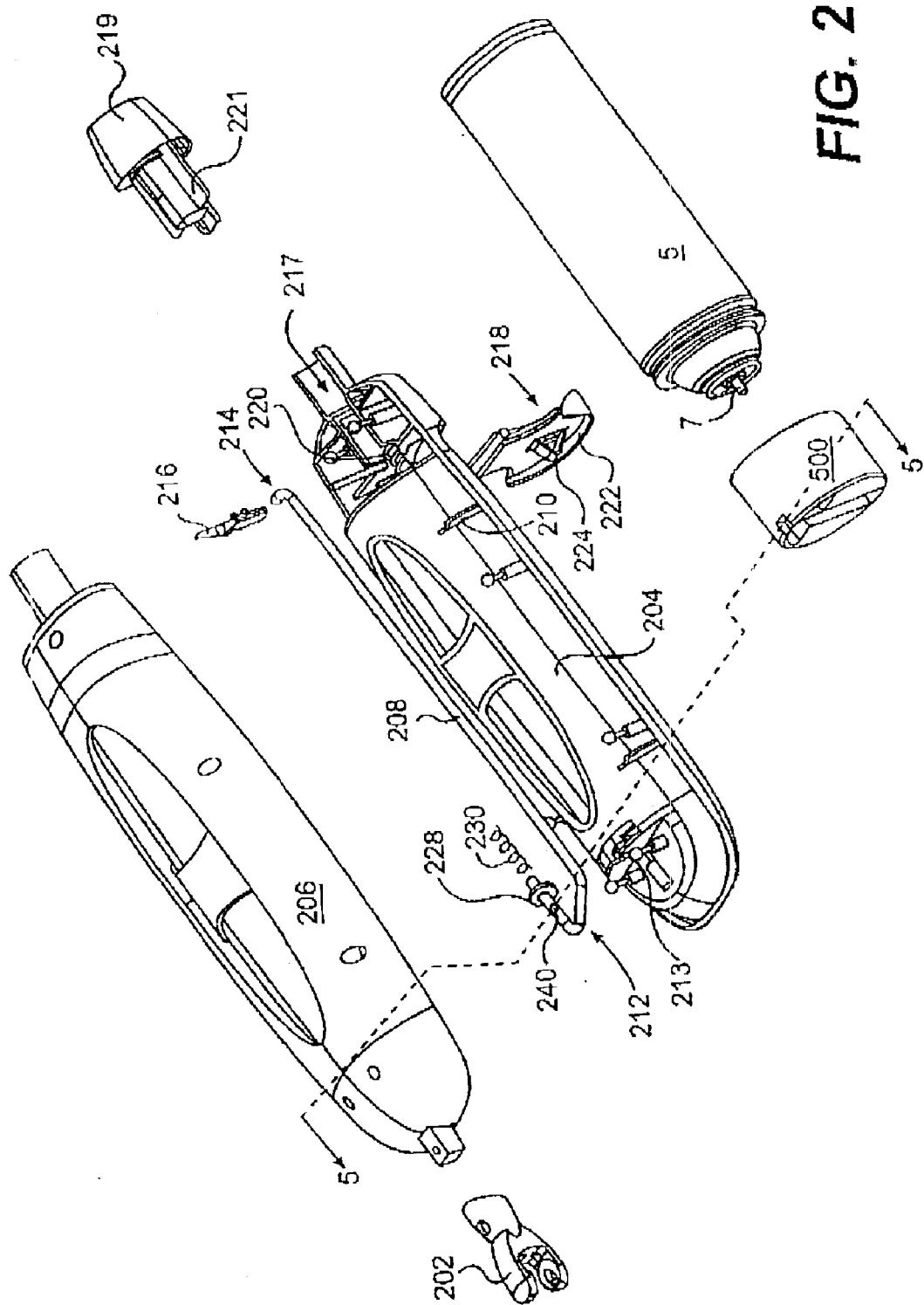
FIG. 2 shows an exploded perspective view of a housing for use with this invention.

As shown in FIG. 2, the housing 200 is comprised of a front panel 204 and a rear panel 206 held together preferably by screws (not shown). Each of the panels 204, 206 includes a half-cylinder at its top (or proximal end), so that when the two panels 204, 206 are joined, a guide hole 217 results. However, the half cylinders do not meet, leaving a slot in the guide hole 217. A collar 219 slides into the guide hole 217 and two fins 221 of the collar 219 slide into the slots.

Preferably, the collar 219 and panels 204, 206 are joined together by screws. Other means of joining the panels and collar are also possible, such as adhesive, plastic fasteners, and the like. Moreover, the housing 200 may be joined to the mop head 100 by a variety of means, including but not limited to a ball joint, a multi-axis hinge joint, a single-axis hinge joint, a fixed connection, a flexible member, or the like.

The panels 204, 206 define a space into which an actuator rod 208 is slidably mounted. The actuator rod 208 is preferably slidably supported on two protrusions 210, but more or fewer than two may also be provided. Also, an actuator rod guiding portion (not shown), such as a groove, may be formed in one or more of the protrusions to aid in guiding the actuator rod 208 during its movement. The bottom end 212 of the actuator rod 208 is bent in a J-shape and includes a flattened portion 240, which supports a washer 228, while the top end 214 is bent at an angle, preferably a right angle, to contact a pivot link 216.

The flattened portion 240 of the actuator rod 208 acts as a stop for the washer 228. That is, the washer 228 may only slide onto the actuator rod 208 up to the flattened portion 240. Of course, other stops may be used to position the washer 228 such as, by way of non-limiting examples, a dimple or bead formed on the actuator rod 208, or a reduced cross-section portion on the actuator rod 208 used in conjunction with a washer having a cross-section so as to mate with that reduced cross-section of the actuator rod 208.

The bottom end 212 of the actuator rod 208 protrudes through an aperture 213 in the front panel 204 to contact an over cap 500 on a canister 5, which is preferably a spray canister such as, for example, of the aerosol type. The washer 228 acts as a base for a spring 230, which biases the actuator rod 208 downwards, away from the over cap 500.

Figure 3:
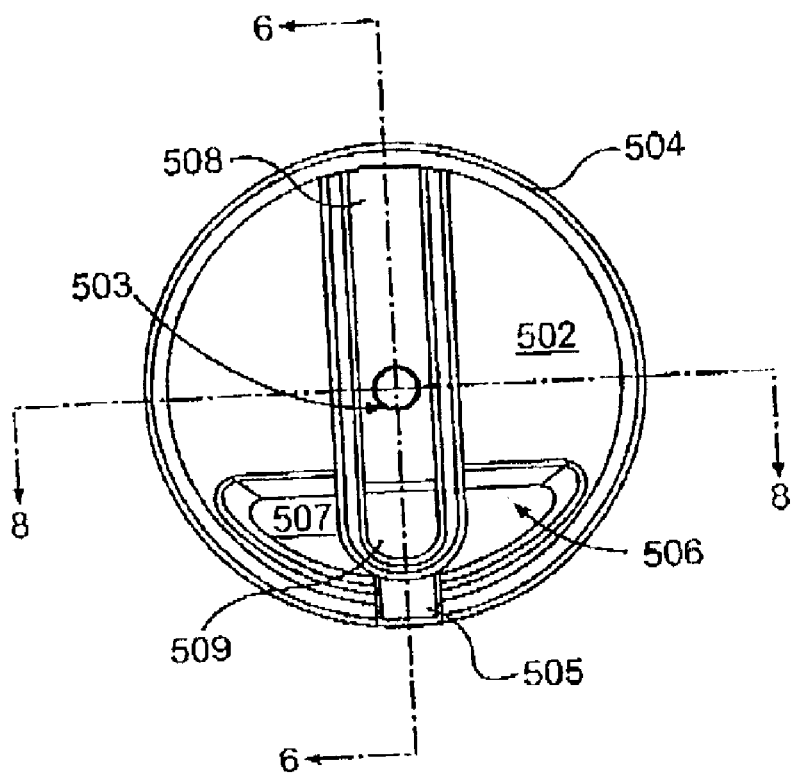
FIG. 3 shows a top plan view of an over cap of this invention.

FIG. 3 shows the over cap 500, which generally comprises a top surface 502, a nozzle 503, a cylindrical wall 504 depending from the top surface 502, a lever arm 508 and an actuator port 505. The actuator port 505 is adapted to receive a terminal end of the bottom end 212 of the actuator rod 208, so that the actuator rod 208 can contact the lever arm 508 at a pad 509.

Figure 5:
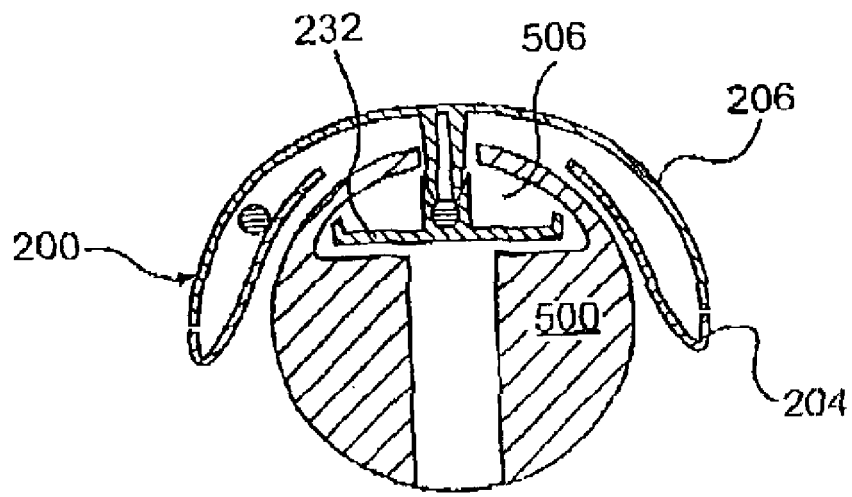
FIG. 5 shows a sectional view, in assembled form, taken along the line 5—5 in FIG. 2 when the over cap is placed in the housing.

FIG. 3 further shows the top surface 502 including a D-shaped recess 506. The D-shaped recess 506 ensures that the over cap 500 is always correctly oriented in the housing 200. As shown in FIG. 5, the housing 200 includes an aligning protrusion 232 for mating with, or receiving there over, the walls of the D-shaped recess 506. In this way, the orientation of the over cap 500 is assured. Of course, the D-shaped recess 506 and the aligning protrusion 232 may take on a variety of shapes, and need not be exactly as illustrated. For example, a plurality of holes and posts may be used.

Figure 4:
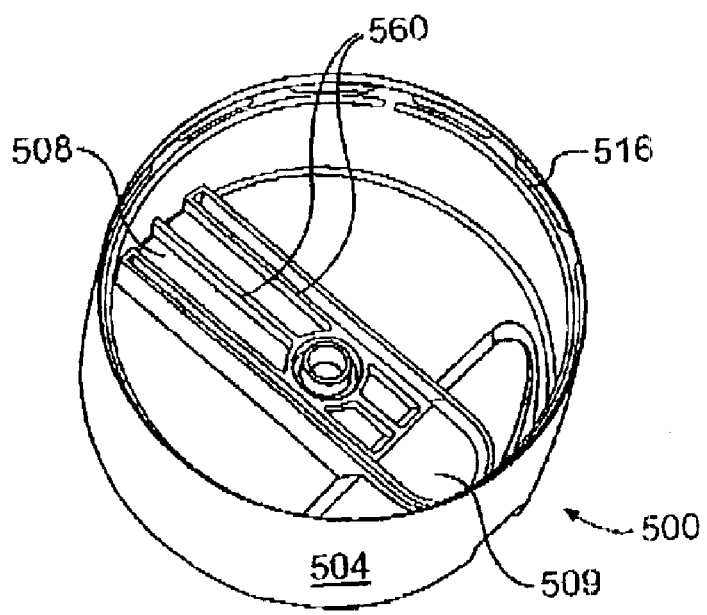
FIG. 4 shows a perspective view of an underside of the over cap according to this invention.
Figure 6:
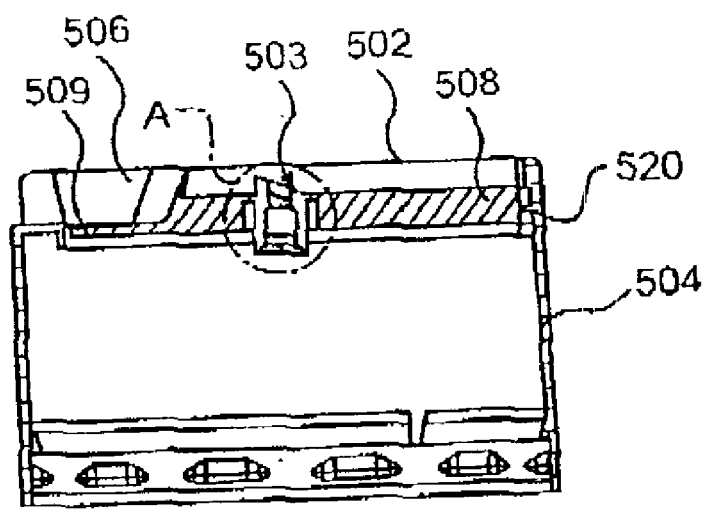
FIG. 6 shows a sectional view along the line 6—6 in FIG. 3.

As shown in FIG. 6, the lever arm 508 substantially traverses the diameter of the top surface 502, and is attached to the cylindrical wall 504 at a pivot point 520, which is positioned at an end opposite from the D-shaped recess 506. The pivoting lever arm 508 is separated from the top surface 502 and the D-shaped recess 506. As shown in FIGS. 3 and 4, the lever arm 508 terminates in the D-shaped recess 506, and is not connected to a floor 507 of the D-shaped recess 506. As such, the pivoting lever arm 508 is free to move out of the plane of the floor 507 of the D-shaped recess 506. A thickness of the lever arm 508 is thinned at the pivot point 520, as shown in FIG. 6, to reduce the force required to pivot the lever arm 508 about the pivot point 520.

Preferably, the lever arm 508 is disposed below the top surface 502 to minimize the risk of unknowing or accidental movement of the lever arm 508, but it may be on the same level as or above the top surface as well. In addition, the lever arm 508 preferably has ribs 560 on its underside to increase its rigidity, as shown in FIG. 4.

As shown in FIG. 4, the interior surface of the cylindrical wall 504 has a plurality of ribs 516 at its base. These ribs 516 engage a rim on the canister 5, holding the over cap 500 securely to the canister 5. Of course, alternative means to secure the over cap 500 to the canister 5 may be used, such as adhesive, or even integrally forming the over cap 500 with the canister 5.

Viewing the over cap 500 as depicted in FIG. 3, it is clear that one of the advantages of the over cap 500 is that it cannot be easily actuated by children. Even if a child could remove the canister 5 from the housing 200, the child would have difficulty pressing on the lever arm 508 in an unknowing attempt to cause the canister 5 to expel its contents, since the lever arm 508 presents no easily-accessible grip or button with which to actuate the canister 5.

Figure 7:
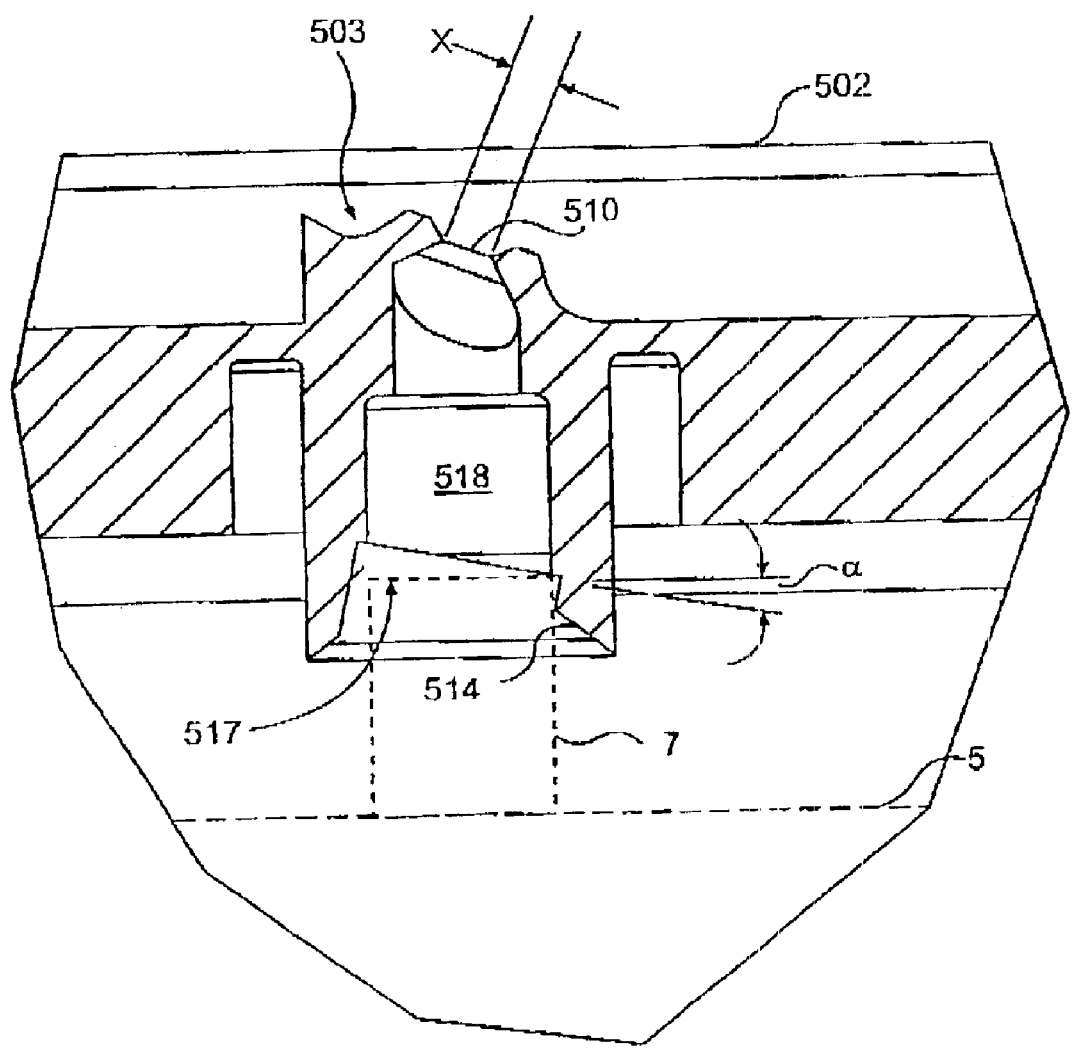
FIG. 7 is a detailed view of area A in FIG. 6.
Figure 8:
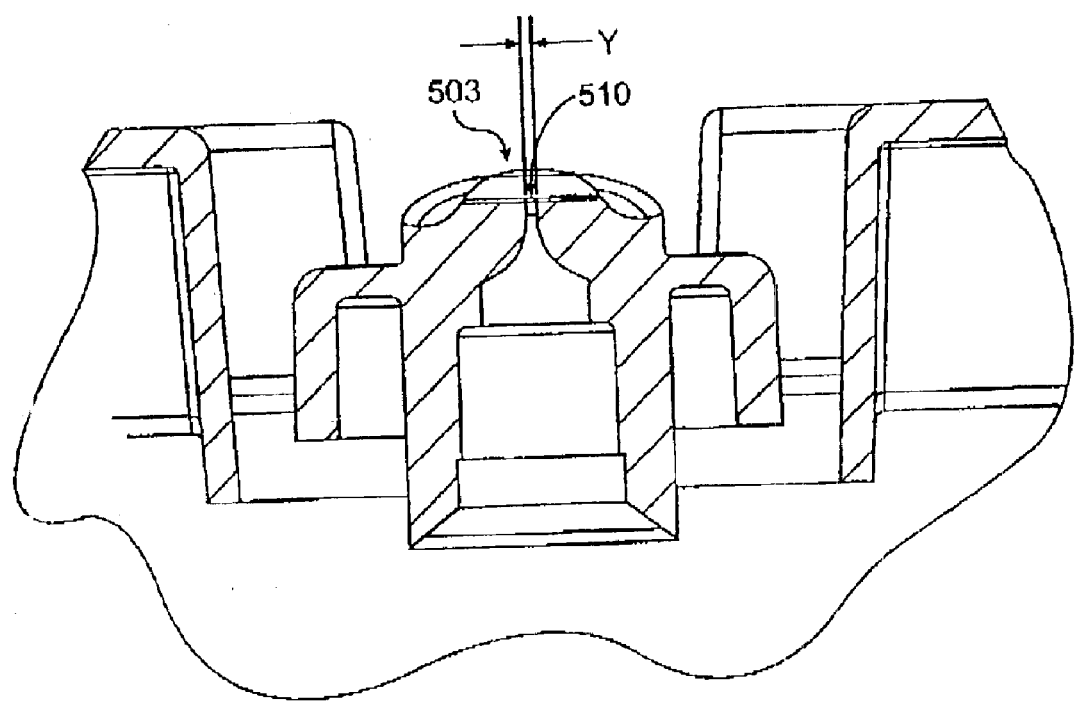
FIG. 8 is a partial sectional view taken along lines 8—8 in FIG. 3, showing a nozzle.

As shown in FIGS. 7 (a detailed view of area A of FIG. 6) and 8 (a partial sectional view taken along line 8—8 of FIG. 3), the nozzle 503 of the over cap 500 is adapted to provide a fan-shaped spray at a predetermined angle as measured from the top surface 502. This angle may be between 40° and 90°, preferably between 70° and 85°, and more preferably 78.5°. An opening 510 is tilted with respect to the top surface 502 to achieve the angled spray, as evident in FIG. 7.

To achieve a fan-shaped spray, the opening 510 is wider in a first direction than it is in a second direction, where the first direction is substantially orthogonal to the second direction. In particular, the width x of the opening 510 shown in FIG. 7 is greater than the width y shown in FIG. 8. This results in a spray that is wider in a direction perpendicular to a length of the lever arm 508 than in a direction parallel with the length of the lever arm 508. Of course, the spray may be rotated in any direction so that its width points in any direction without departing from the scope of the invention.

As shown in FIG. 7, the end of the nozzle 503 nearest the canister 5, which makes up a stem socket, comprises a chamfered opening 514 leading into a tilted undercut 517. A cylindrical cavity 518, which is integral with and beyond the undercut 517 of the stem socket, is configured so as to have an inner diameter smaller than an outer diameter of the valve stem 7 of the canister 5, thus acting as a stop for the valve stem 7 and preventing the valve stem 7 from entering the cylindrical cavity 518.

The tilted undercut 517 is preferably tilted at an angle of about 5°, although other angles may also be used, to effect a sealing engagement between the tilted undercut 517 and a top portion of the valve stem 7 when the lever arm 508 is actuated, i.e., depressed downward relative to the top surface 502.

Figure 9:
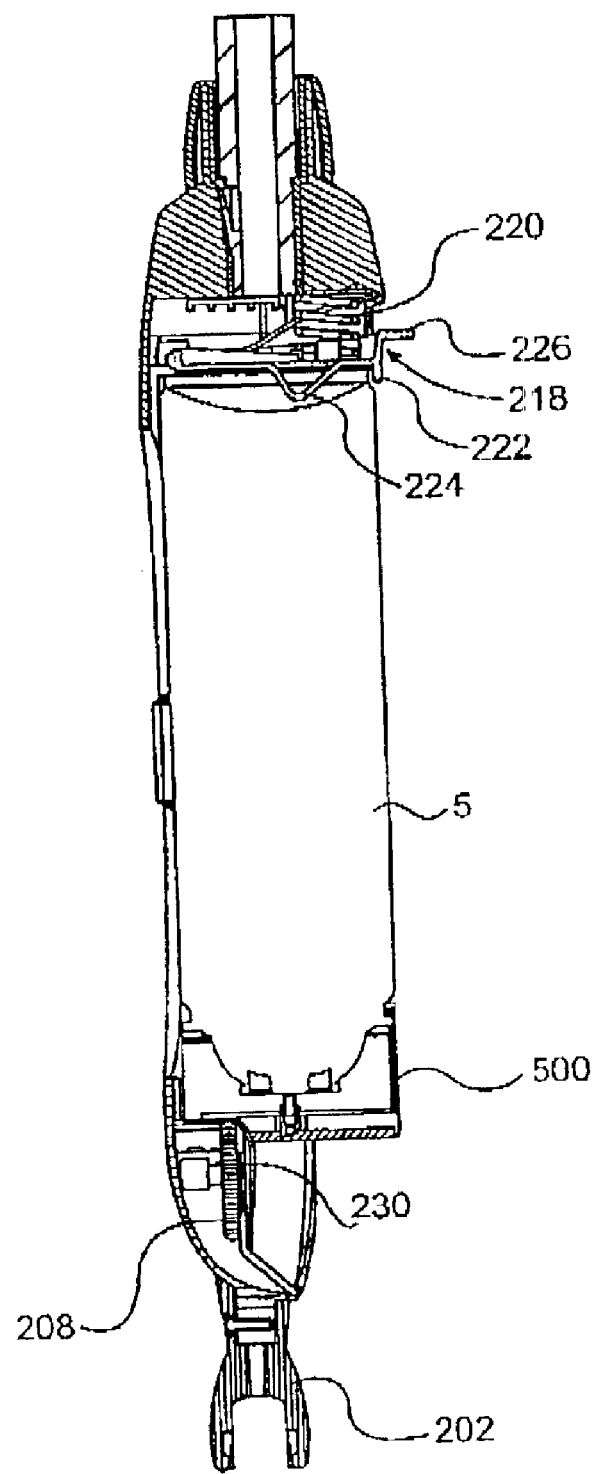
FIG. 9 is a sectional view of the housing of this invention holding the canister.

As illustrated in FIGS. 2, 5, and 9, the housing 200 retains the canister 5/over cap 500 assembly using a retainer 218 and the aligning protrusion 232. The aligning protrusion 232 acts not only to provide for a proper orientation of the over cap 500, but also acts as a support, e.g., a "pin-like" support, to retain the over cap end of the canister 5/over cap 500 assembly in the housing 200. The canister end of the canister 5/over cap 500 assembly is retained in the housing 200 by the retainer 218.

The retainer 218 is spring-biased against the canister 5 by a spring 220 and retains the canister 5 by a friction force between the retainer 218 and the canister bottom. In addition, the retainer 218 includes a lip 222 along its outer periphery, as shown in FIG. 2, that contacts an outer surface of the canister 5 and prevents the canister 5/over cap 500 assembly from dislodging or "falling out" of the housing 200.

The retainer 218 further includes an abutment 224 protruding from a surface of the retainer 218, which contacts a bottom surface of the canister 5 to also prevent the canister 5/over cap 500 assembly from freely releasing or "falling out" of the housing 200. As shown in FIG. 9, the retainer 218 preferably includes a tongue or handle 226, so that the retainer 218 can be easily biased against the spring 220 by a user to remove the canister 5 from the housing 200.

To install the canister 5/over cap 500 assembly into the housing 200, a user first inserts the over cap end of the canister 5/over cap 500 assembly into the housing 200, causing the D-shaped recess 506 to matingly receive the aligning protrusion 232. In this position, the D-shaped recess 506 of the over cap 500 rests on the aligning protrusion 232. Then, the user presses the canister end of the canister 5/over cap 500 assembly into the housing 200 until the retainer 218 fittingly engages the canister end of the canister 5/over cap 500 assembly.

Alternative means for holding the canister end of the canister 5/over cap 500 assembly are also contemplated, and the retainer 218 may be omitted without departing from the scope of the invention. For example, a clip may be integrally formed in the front panel 204, allowing the canister 5 to snap into the housing 200. In addition, an elastic strap may hold the canister 5 to the housing 200. Variations of the retainer 218 as shown may also be used, such as a retainer 218 without any or all of the abutment 224, handle 226, and lip 222.

Figure 10:
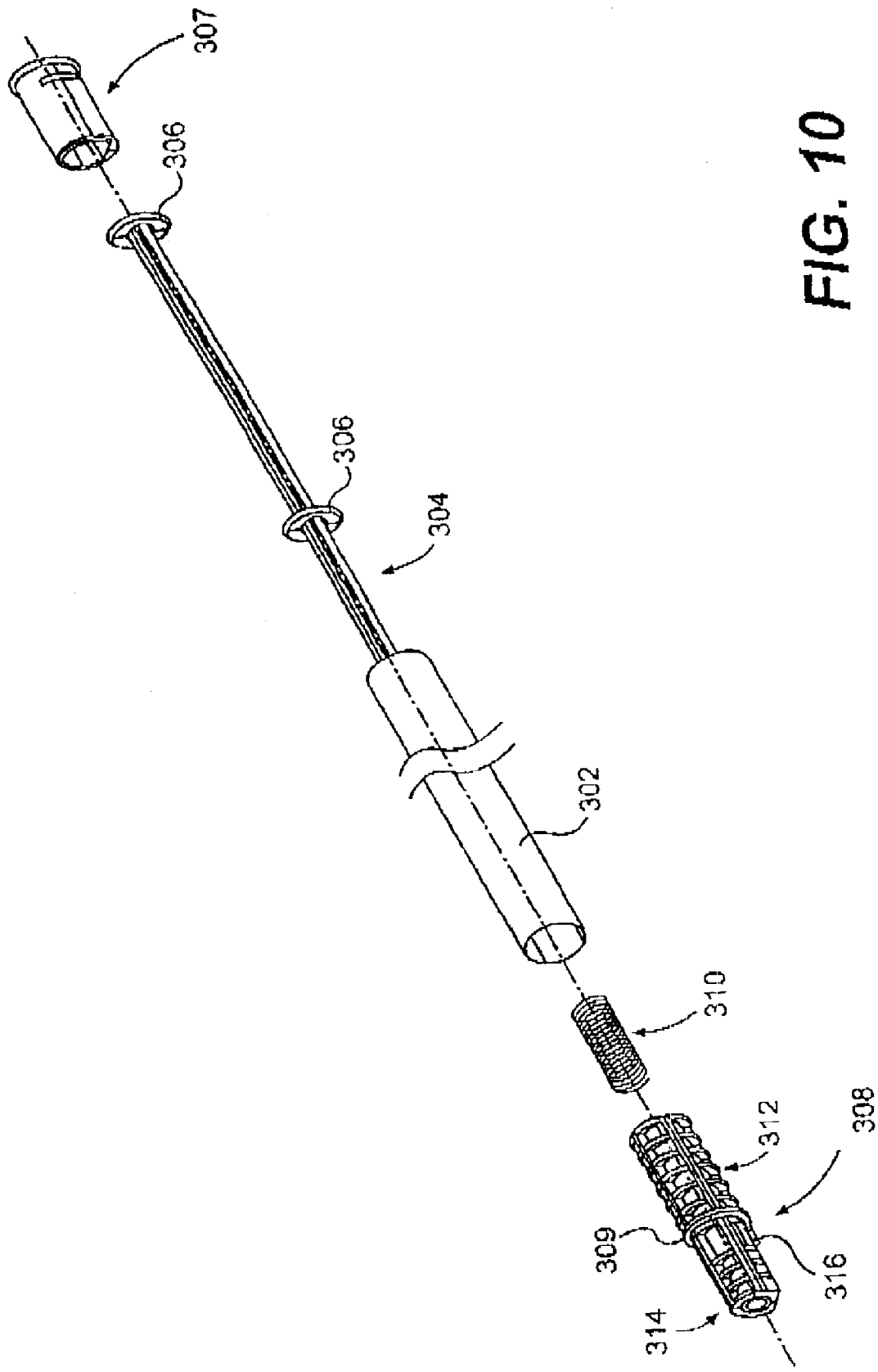
FIG. 10 is an exploded perspective view of a lower end of a shaft assembly of this invention.
Figure 11:
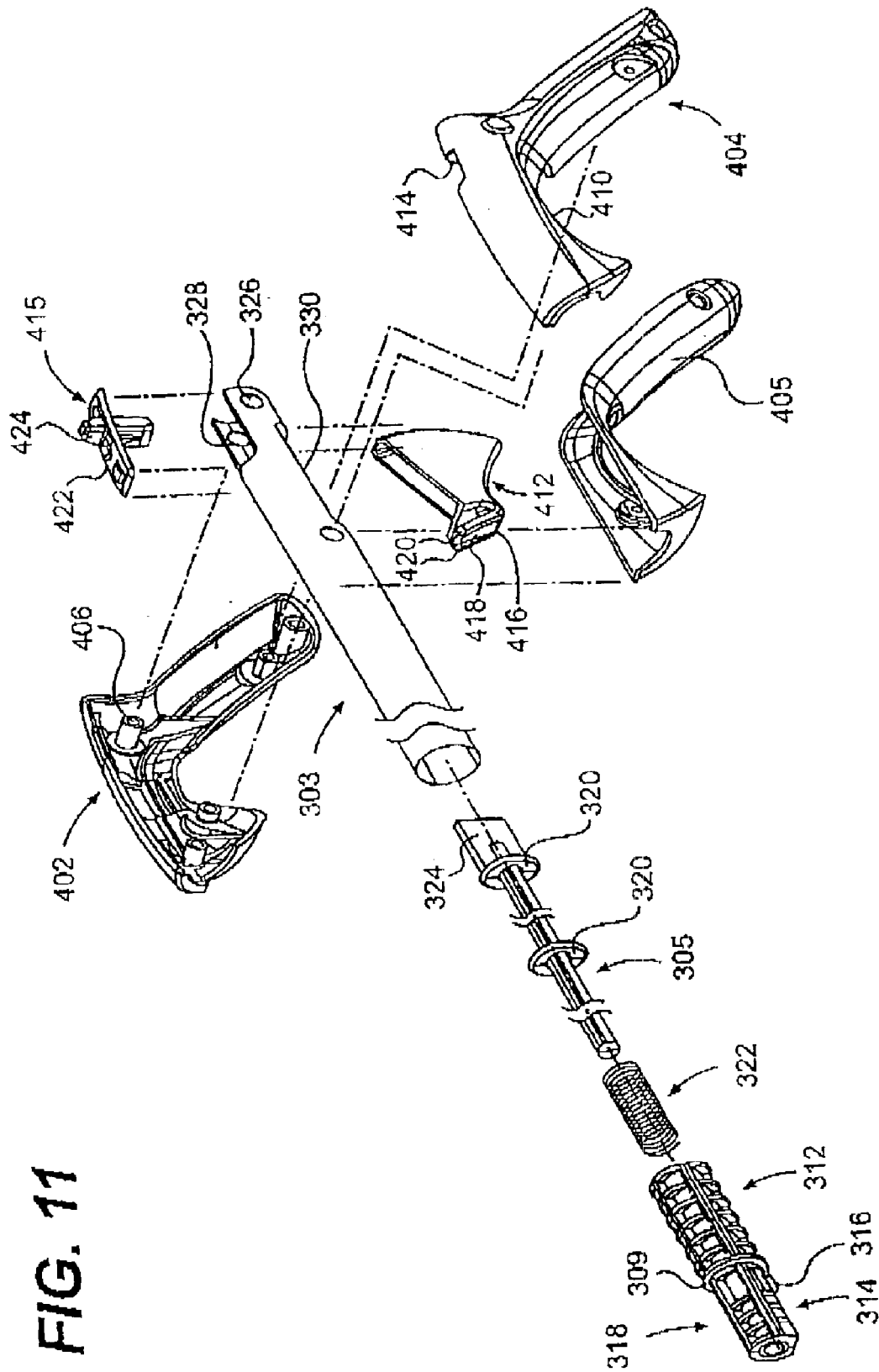
FIG. 11 is an exploded perspective view of an upper end of a shaft assembly and a handle of this invention.

Referring next to FIGS. 10 and 11, the shaft assembly 300 connects, preferably in a removable manner, to the collar 219 of the housing 200, as discussed below, and comprises a lower hollow shaft 302 into which a slidable lower core 304 fits and an upper hollow shaft 303 into which a slidable upper core 305 fits. The lower core 304 has a plurality of flanges 306, which keep the lower core 304 centered in the lower hollow shaft 302.

A housing plug 308 is provided at the end of the lower hollow shaft 302 nearest the housing 200, and is engaged with that end of the lower hollow shaft 302. Such engagement may be effected, by way of non-limiting examples, through a friction fit, an adhesive bond, a bond formed by thermal or ultrasonic fusion, pins, screws, crimping, or the like.

At a distal end of the lower hollow shaft 302, furthest from the housing 200, is a female plug 307. The female plug 307 is also engaged, in a manner as described above with respect to the housing plug 308, with the lower hollow shaft 302. A spring 310 between one of the plurality of flanges 306 and the housing plug 308 keeps the lower core 304 biased away from the housing plug 308.

As indicated in FIG. 11, the upper hollow shaft 303 houses an upper core 305 slidably disposed therein. The upper core 305, similarly to the lower core 304, has a plurality of flanges 320. A connecting plug 318 is engaged, in a manner as described above with respect to the housing plug 308, with the upper hollow shaft 303 at a connecting end of the upper hollow shaft 303 (that is, the end nearest the lower hollow shaft 302).

The housing plug 308 and the connecting plug 318 each comprises a plurality of rings joined by longitudinal ribs, and is generally divided by a large ring 309 into an upper half 312 and a lower half 314. The upper half 312 of each of the housing plug 308 and connecting plug 318 is shaped and sized to fit snugly into each of the lower hollow shaft 302 and the upper hollow shaft 303, respectively.

The lower half 314 has a bullet-shaped cross section (i.e., one flat side), ensuring that the housing plug 308 can only be inserted on one way into either the collar 219 of the housing 200 or the female plug 307. Each plug 308, 318 has a continuous, circular cavity formed there through, which is shaped to permit passage of the appropriate core 304, 305. The housing plug 308 and connecting plug 318 are preferably shaped slightly differently, so that the connecting plug 318 and the upper hollow shaft 303 cannot be mistakenly inserted into the housing 200.

Preferably, the lower half 314 of each plug 308, 318 has a ramped key 316, which snaps into a recess, indentation, notch, window, or the like formed in an interior wall of the collar 219 (in the case of the housing plug 308) or of the female plug 307 (in the case of the connecting plug 318). The window and ramped key mechanism secures, either permanently or removably, the housing plug 308 to the housing 200 and the connecting plug 318 to the lower hollow shaft 302.

In one example, the ramped key 316 providing for the permanent connection is a flexible, wing-like protrusion having a terminal end that flexes inwardly upon insertion into either the collar 219 or the female plug 307. The wing-like protrusion remains inwardly flexed until reaching the window, at which point the terminal end of the wing-like protrusion extends into the window, thereby creating the permanent connection.

The ramped key 316 providing for the removable connection can be a wing-like protrusion having an outwardly ramped surface integral with an inwardly ramped surface, where a peak is formed there between (e.g., a protrusion similar in shape to the standard keyboard character ">"). Upon insertion into either the collar 219 or the female plug 307, this wing-like protrusion remains inwardly flexed until reaching the window, at which point the peak of the wing-like protrusion extends into the window.

This wing-like protrusion is rendered removable by the inwardly ramped surface, which, upon exerting a force to withdraw the lower half 314 from the collar 219 or the female plug 307, causes the wing-like protrusion to once again inwardly flex, thereby extracting the peak from the window and allowing for removal. Of course, other means of permanently or removably attaching the lower half 314 to the collar 219 or the female plug 307 may be used such as, by way of non-limiting example, fixed pins, screws, clamps, spring-loaded pins, bolts, twist-and-lock connections, and the like.

As with the lower core 304, a spring 322 biases the upper core 305 away from the connecting plug 318 by pressing against one of the flanges 320, as shown in FIG. 11. An actuating block 324 is preferably attached to the upper core 305 at the grip, or distal, end of the upper core 305. Of course, the manner of attachment may include any of those discussed above with regard to the housing plug 308.

As shown in FIG. 11, a grip end of the upper hollow shaft 303 includes a plurality of holes 326 there through. In addition, the upper hollow shaft 303 has a top cutout 328 and a bottom cutout 330 (where the top and bottom are defined with regard to the location of the holes 326, which defines the sides). Of course, the term "cutout" does not implicate a method of forming the cutouts, as the cutouts 328, 330 may be formed by removing material or molding the upper hollow shaft 303 with the cutouts 328, 330 formed therein. Rather, the term refers to the space in the upper hollow shaft 303.

FIG. 11 shows a handle 400 comprised of a right panel 402 and a left panel 404. Each of the right panel 402 and the left panel 404 preferably includes three protrusions 406 (two of which are long enough to extend through the holes 326 in the upper hollow shaft 303 and contact each other). The right panel 402 and the left panel 404 are secured together by screws passing through the protrusions 406 of one of the panels 402, 404 and into the protrusions 406 of the other panel 402, 404. Of course, other means to hold the right panel 402 and the left panel 404 together may be used such as, by way of non-limiting example, bolts, pressure-fit pins, adhesive, and the like, and more or fewer than three protrusions and holes may be provided. Moreover, although only a right and left panel are described, a grip insert 405, preferably formed of a soft material, may also be provided.

Each of the right and left panels 402, 404 includes a curved portion so that when the panels 402, 404 are secured together by the screws to form the handle 400, a trigger opening 410 on the bottom is formed. The trigger opening 410 receives a trigger 412 there through. The trigger 412 is pivotally held in position by a pin (not shown), which passes either through or into panels 402, 404 and through a hole in the trigger 412.

Of course, other means for pivotally supporting the trigger 412 may be used such as, by way of non-limiting example, a bolt, a screw, a hollow tube, and the like. The trigger 412 includes a U-shaped extension or lip 416, a front face 418 of which is rectangular and has side rails 420. The rectangular front face 418 contacts the actuating block 324, and the rails 420 prevent the actuating block 324 from moving laterally. Of course, the rails need not be provided, and the front face 418 need not be rectangular. Further, any means of transforming a pivoting action into a linear action is acceptable, such as a cam and follower or a rack gear.

Each of the panels 402, 404 also includes a curved portion in its top, so that when the panels 402, 404 are secured together, a lock opening 414 is formed. The lock opening 414 receives a trigger lock 415, and includes ribs (not shown) for guiding the trigger lock 415. The trigger lock 415 includes a horizontal plate 422 and a vertical switch 424, as shown in FIG. 11. The vertical switch 424 protrudes out of the lock opening 414 above an outer surface of the handle 400, so that a user can contact the vertical switch 424 with a finger, and extends below the horizontal plate 422 into the upper hollow shaft 303. The horizontal plate 422 slides along an axis parallel to a longitudinal axis of the upper hollow shaft 303, and is guided during such sliding motion by the ribs.

When a user pushes against or pulls on the vertical switch 424, the horizontal plate 422 slides along the upper hollow shaft 303 and within the ribs of the handle 400. In a locked position, the trigger lock 415 is in its most forward position, towards the mop head 100. In an unlocked position, the trigger lock 415 is in its most rearward position, furthest from the mop head 100. In the locked position, the vertical switch 424 contacts, or nearly contacts, the trigger 412. As such, when a user attempts to squeeze the trigger 412, a top of the trigger 412 contacts the vertical switch 424, preventing further movement of the trigger 412.

An advantage of the cleaning device of this invention is its modular construction. The mop head 100, the housing 200 and the shaft assembly 300 may all be separate pieces that can be packaged separately and compactly. In the preferred embodiment, the shaft assembly 300 can be packaged in two parts, i.e., the lower hollow shaft 302 and the upper hollow shaft 303. Each of the lower hollow shaft 302 and the upper hollow shaft 303 is preferably packaged to include the plugs 308, 318, springs 310, 322 and inner cores 304, 305.

The lower hollow shaft 302 preferably has the female plug 307 attached to its distal end, and the upper hollow shaft 303 preferably has the handle 400 attached to its distal end. Likewise, the housing 200 can be packaged as a complete unit to include the actuator rod 208, washer 228, spring 230, pivot link 216 and retainer 218. As such, when a user removes the cleaning device 1 from the package, the user simply snaps the lower hollow shaft 302 to the housing 200 and the upper hollow shaft 303 to the lower hollow shaft 302.

In operation, a user generally utilizes the trigger-actuated mop like any conventional mop. However, when the user desires to apply the contents of the container 5 (e.g., cleaning fluid) to the surface being cleaned, the user simply squeezes the trigger 412. At this time, the trigger 412 pivots causing the lip 416 to press against the actuating block 324, which moves the upper core 305 downward toward the mop head 100. The upper core 305 moves through the circular cavity in the connecting plug 318 past the female plug 307 and contacts the lower core 304.

As a result, the lower core 304 slides through the housing plug 308 and into the housing 200. The bottom of the lower core 304 contacts the pivot link 216, causing the pivot link 216 to rotate, thereby moving the actuator rod 208 in an actuating direction toward the proximal end (i.e., in a direction substantially opposite to the sliding direction of the lower core 304). The terminal end of the bottom end 212 of the actuator rod 208 slides up through the aperture 213 in the front panel 204 and contacts the pad 509 of the lever arm 508 of the over cap 500.

The lever arm 508 pivots toward the valve stem 7 on the canister 5, and the shoulder formed at the top of the cylindrical cavity 518 in the stem socket presses on the valve stem 7, opening a valve (not shown) in the canister 5 to allow projection of the contents of the canister 5 through the nozzle 503 and onto the surface to be cleaned. When the trigger 412 is released, the springs 310, 322 in the hollow shafts 302, 303, respectively, bias the cores 304, 305, respectively, upwards against the trigger 412, causing the trigger 412 to pivot back into its original, non-activated position. This action relieves the force on the actuator rod 208 and allows the spring 230 to bias the actuator rod 208 away from the over cap 500. A spring (not shown) in the valve in the canister 5 returns the valve stem 7 back to its original position, closing the valve and stopping the contents of the canister 5 from exiting the canister 5.

The components of this invention, such as the mop head 100, housing 200, shaft assembly 300, handle 400, and over cap 500, are preferably molded from plastic, such as ABS resin for its glossiness and strength. However, these molded components may also preferably be made from polypropylene, for its low cost.

Particularly in accordance with the additional disclosure of this application relative to the priority case, the inventors propose the improved canister assembly concepts of FIGS. 12–16. These all rely on the canister itself being provided with a female valve at its upper end that is activated by a separate/removable valve stem associated with an actuator (e.g., the over cap lever of FIG. 13, the over cap integral stem of FIG. 14, the over cap separable, valve stem of FIG. 15, and the button actuator of FIG. 16.

Figure 12:
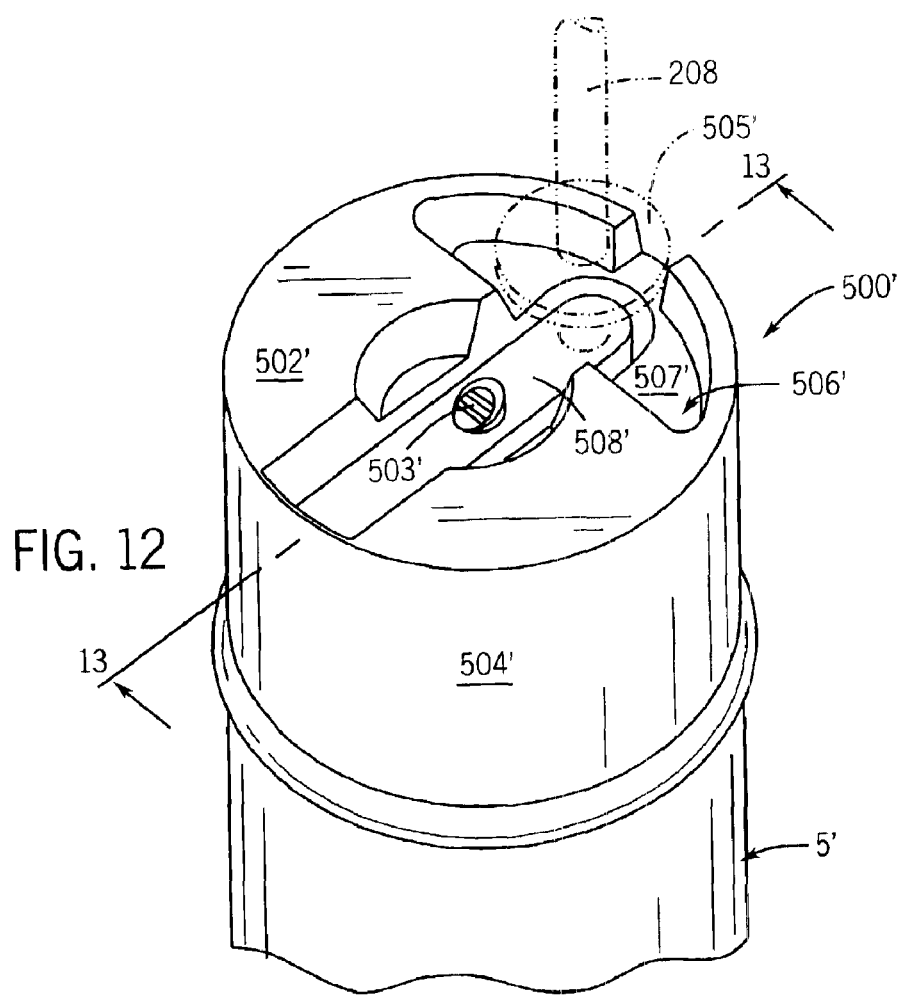
FIG. 12 is a partial perspective view depicting an alternative embodiment of a cleanser containing canister having a female valve for use with the above assembly, with an actuator rod shown in partial phantom.
Figure 13:
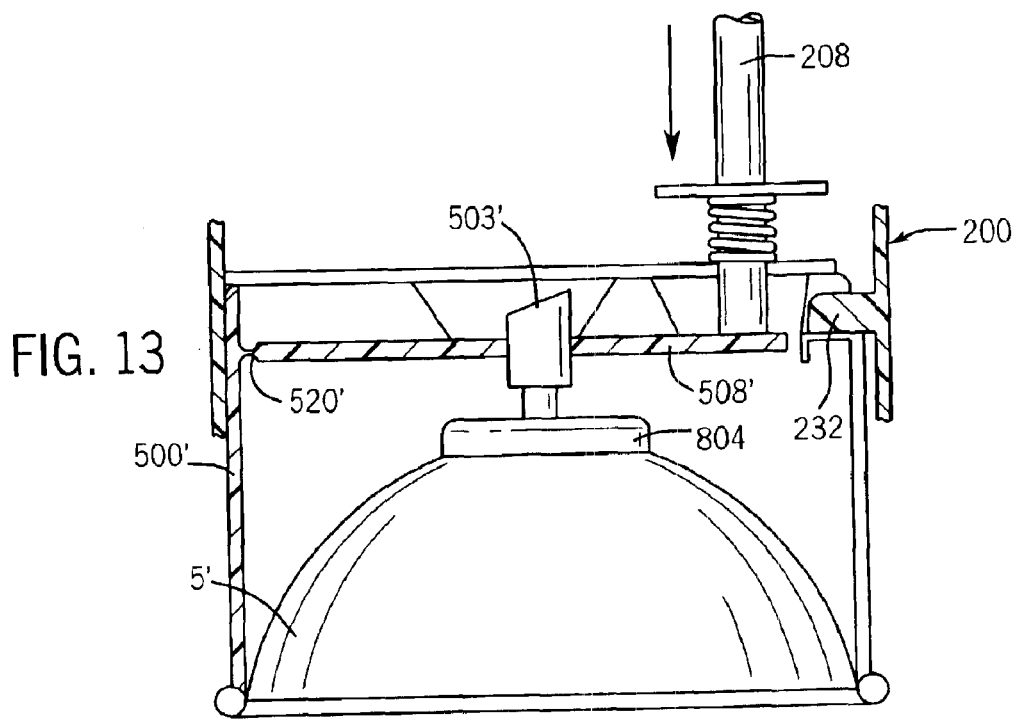
FIG. 13 is a partial cross-sectional view taken along line 13—13 of FIG. 12, through an over cap of the present invention when used in the above assembly.

FIGS. 12 and 13 depict a canister 5' and an over cap 500' very similar to those described above except for that the canister 5' has a female valve assembly and the over cap 500' has include a male valve stem. Canister 5' is suitable for use with the above assembly (identical in overall size and configuration) and the three additional embodiments of the invention shown in FIGS. 14–16. The over cap 500' as shown in FIGS. 12 and 13 is somewhat relevant to the unitary valve stem embodiment of FIG. 14 and the separate valve stem embodiment of FIG. 15. The over cap 500' is not required for the button actuator embodiment of FIG. 16.

Referring to FIGS. 12 and 13, the over cap 500' has a top surface 502', a nozzle 503', a cylindrical wall 504' depending from the top surface 502', a lever arm 508' and a D-shaped recess 506' with a notch 505'. The D-shaped recess 506' ensures that the over cap 500' is always correctly oriented in the housing 200' by receiving the aligning protrusion 232 as discussed above and shown in FIG. 5.

As before, the lever arm 508' substantially traverses the diameter of the top surface 502', and is hinged to the cylindrical wall 504' at a pivot point 520' opposite from the D-shaped recess 506' so that it is free to move out of the plane of a floor 507' of the D-shaped recess 506'. Again as before, a thickness of the lever arm 508' is thinned at the pivot point 520' to reduce the force required for actuation.

The nozzle 503' of the over cap 500' is adapted to provide a fan-shaped spray at a predetermined angle as measured from the top surface 502', preferably ranging between 40° and 90°, more preferably between 70° and 85°, and even more preferably 78.5°. An opening 510' is tilted with respect to the top surface 502' to achieve the angled spray. The fan-shaped spray is achieved in the same manner as above by making the opening 510' wider in a first direction than it is in an orthogonal second direction (see FIG. 8).

Referring now to FIG. 14, an end of the nozzle 503' nearest the canister 5' forms an elongated, generally tubular integral valve stem 600. In the over cap embodiment of FIG. 15, the end of the nozzle 503' nearest the canister 5' makes up a stem socket 700 tapering inward to an cylindrical inner diameter 702 sized only slightly larger than a separate tubular valve stem 704 to receive it in a tight fit. The valve stem either unitary 600 or separable 704 interfaces with an orifice 800 in a female valve 802 of the canister 5' to spray contents of the canister 5' through the nozzle 503' when the lever arm 508' is depressed.

The female valve 802 is of a known construction for aerosol canisters. The valve 802 has an outer valve cup 804 defining the orifice 800 and capping the end of the canister 5', a gasket (not shown) may provided at this the valve cup/canister interface for better sealing. Below the valve cup 804 is a gasket 806 around the valve stem and between the valve cup 804 and a cylindrical valve housing 808.

The valve housing 808 has an open upper end and a hose barb type lower end 810 for attaching a dip tube (not shown) extending down near the bottom of the canister 5'. The valve housing 808 also has a flanged upper end that is captured by a crimp in the hub of the valve cup 804 to secure it in place. The valve housing 808 supports a spring 814 and a stem cup 816. The stem cup 816 has a lower end around which the spring 814 fits and an open upper end defining a circular groove receiving the bottom of the valve stem tightly. The outer diameter of this upper end of the stem cup 816 is slightly smaller than the inner diameter of the valve housing 808 to define an annular flow channel 820 there between.

Before the valve 802 is actuated, the pressurized contents of the canister 5' are prevented from escaping by the seal created between the gasket 806 and the top of the stem cup 816. However, when the valve stem pushes the stem cup 816 downward, this seal is broken allowing some of the pressurized contents to pass through the annular flow channel 820 to an opening 822 near the bottom of the valve stem which is in communication with the nozzle 503'. Removing the downward force on the valve stem allows the spring 814 to reseat the stem cup 816 against the gasket 806, thereby restoring the seal.

The operation of the assembly with the two alternate over cap embodiments of FIGS. 14 and 15 is identical to that described above. Briefly (with additional reference to FIGS. 1, 2, 10 and 11), the user simply squeezes the trigger 412, which causes the lip 416 to press against the actuating block 324, which moves the upper core 305 downward toward the mop head 100, which in turn moves through the circular cavity in the connecting plug 318 past the female plug 307 and contacts the lower core 304. As a result, the lower core 304 slides through the housing plug 308 and into the housing 200.

The bottom of the lower core 304 contacts the pivot link 216, causing the pivot link 216 to rotate, thereby moving the actuator rod 208 in an actuating direction to contacts the pad 509' of the lever arm 508'. The lever arm 508' pivots toward the canister 5', which in turn causes the valve stem to unseat the stem cup 816 to allow projection of the contents of the canister 5' through the nozzle 503' and onto the surface to be cleaned. When the trigger 412 is released, the springs 310, 322 in the hollow shafts 302, 303, respectively, bias the cores 304, 305, respectively, upwards against the trigger 412, causing the trigger 412 to pivot back into its original, non-activated position. This action relieves the force on the actuator rod 208 and allows the spring 230 to bias the actuator rod 208 away from the over cap 500'. The valve spring 814 returns the valve stem back to its original position, closing the valve and stopping the contents of the canister 5' from exiting the canister 5'.

The alternate embodiment of FIG. 16 replacing the over cap with a button actuator 900 operates in the same manner except that the actuator rod 208 contacts the top end of the button actuator 900 directly rather than an intermediate pivotal member of an over cap. The button actuator 900 can be of a conventional construction provided it has a male valve stem 902 defining a passage 904 from a lower opening 906 to a nozzle 908, which preferably provides a wide spray pattern at an oblique angle to the canister 5', as described above.

The preceding description is merely of preferred embodiments of the invention. One skilled in the art will readily apprehend alternative embodiments that nevertheless fall within the scope and breadth of the invention. For example, an embodiment of the invention in which an over cap with a pivoting lever arm that contacts and operates a separate stemmed button actuator, while not described in detail herein, is also within the scope of the present invention. Thus, the claims should be looked to in order to understand the full scope of the invention.

INDUSTRIAL APPLICABILITY

Disclosed are devices for facilitating the cleaning of hard surfaces such as floors and walls, and aerosol canisters suitable for supplying cleaning materials for use therewith.

What is claimed is:

1. An aerosol canister assembly for delivering a chemical from an interior cavity of a canister to a desired location, the assembly comprising:

a canister suitable for holding a chemical mixed with a pressurized propellant gas, the canister having a valve with an upwardly open female cavity, the valve being suitable for controlling the delivery of the chemical from the canister to the outside of the canister when the chemical is positioned in the canister with the propellant gas; and an over cap positionable on the canister over the valve, the over cap having a nozzle opening and being linked to a valve stem;

wherein the valve stem is insertable into the female cavity by axial relative movement there between, the valve stem defining a pathway for expelling the chemical in the canister from the nozzle opening when the valve is opened by the valve stem if the chemical is positioned in the canister with the propellant gas;

wherein the canister is retained by a housing, a shaft is connected to the housing at one end and mounts a handle at an opposite end, the handle having a trigger, and there is an initiator assembly causing movement of the trigger to move a portion of the over cap when the chemical is to be dispensed; and wherein the housing includes an alignment protrusion and the over cap has a top wall defining a recess sized to receive the alignment protrusion such that the over cap is received in the housing in a correct orientation.

2. The aerosol canister assembly of claim 1, wherein the valve stem is in communication with a spray nozzle adapted to provide a fan-shaped spray.

3. The aerosol canister assembly of claim 1, wherein the over cap comprises a button having the valve stem integrally formed therewith.

4. The aerosol canister assembly of claim 1, wherein the over cap comprises a button, and the valve stem is removably connected to the button.

5. The aerosol canister assembly of claim 1, wherein the valve stem is removably connected to the over cap; and whereby when the valve stem and over cap are still removably connected together and the valve stem is inserted in the female cavity, the assembly is configured such that the valve stem can be removed from the female cavity by axial relative movement between the valve stem and female cavity.

6. The aerosol canister assembly of claim 5, wherein the over cap has a stem socket in communication with the nozzle opening, the stem socket being sized to receive the valve stem.

7. The aerosol canister assembly of claim 6, wherein the stem socket opens to an interior defined by a cylindrical wall extending to one side of a top wall of the over cap.

8. The aerosol canister assembly of claim 5, wherein the over cap has a radially peripheral wall to which is hinged a lever arm suitable for mounting the valve stem for displacement of the valve.

9. The aerosol canister assembly of claim 8, wherein the lever arm includes the nozzle opening and defines a stem socket sized to receive the valve stem.

10. The aerosol canister assembly of claim 1:

wherein the shaft is hollow and the initiator assembly includes a core slidable in the shaft and a rod disposed in the housing in contact with a pivot link pivotally attached to the housing and coupled to the slidable core; and wherein the trigger is actuated to slide the slidable core which in turn pivots the pivot link and brings the rod into contact with the over cap.

11. The aerosol canister assembly of claim 10, wherein the rod and the slidable core move in substantially opposite directions.

* * * * *